3,446,592
PREPARATION OF CHLORINE MONOFLUORIDE
Mario A. Gambardella, Milford, Albert W. Jache, North Haven, and Santad Kongpricha, Hamden, Conn., assignors to Olin Mathieson Chemical Corporation
No Drawing. Filed Oct. 21, 1965, Ser. No. 500,300
Int. Cl. C01b 7/24, 9/08
U.S. Cl. 23—205                                    5 Claims

ABSTRACT OF THE DISCLOSURE

Chlorine monofluoride is prepared by heating at 100° to 1000° C. a mixture of chlorine and a metal fluoride, the metal having an atomic number of 3 to 79 inclusive and standing in Group I of the Periodic Table.

---

This invention relates to a novel method for the preparation of chlorine monofluoride by the reaction at elevated temperatures of gaseous chlorine with certain metal fluorides and separating chlorine monofluoride from the resulting gaseous products.

Chlorine monofluoride is known and useful as a fluorinating agent and as a vigorous oxidizer. It would be valuable as a rocket fuel oxidizer if it could be made cheaply available. The prior art methods for the manufacture of chlorine monofluoride usually require the use of elemental fluorine which is produced electrolytically at high cost.

It is an object of this invention to prepare chlorine monofluoride by a process avoiding costly elemental fluorine. Another object of this invention is to prepare chlorine monofluoride from metal fluorides which are cheaper than elemental fluorine. A further object of this invention is to prepare chlorine monofluoride using cheap elemental chlorine as reagent. Other and further objects appear in the following description.

It has now been found that chlorine monofluoride can be prepared by the reaction of elemental chlorine with certain metal fluorides at elevated temperatures to produce chlorine monofluorides.

Suitable metal fluorides for the process of this invention are the fluorides of the metallic elements of Group I of the Periodic Table having atomic numbers from 3 to 79 inclusive. These are the alkali metal elements, lithium, sodium, potassium, rubidium and cesium and the sub-group elements, copper, silver and gold. Included in the term "fluoride" in the present specification and claims are the bifluorides, $MHF_2$, and the borofluorides, $MBF_4$ where M is one of the recited metal elements. Mixtures of these fluorides are also suitable and hydrogen fluoride may also be present in the reaction mixture.

Suitable temperatures for the process of this invention are from about 100° C. to 1000° C.

The primary gaseous reaction product of this invention usually contains excess chlorine. Hydrogen fluoride is usually present when it was a component of the reaction mixture. When these materials are not objectionable the crude gaseous product is suitable for use without purification for its content of chlorine monofluoride. Where the chlorine monofluoride free from diluents is desirable, the chlorine monofluoride is separated, by fractionation, for example, by chromatographic methods.

EXAMPLE I

A salt mixture consisting of 5 g. NaF, 10 g. LiF and 60 g. $KHF_2$ was mixed intimately in a polyethylene bottle and then placed in a 150 ml. Monel cylinder having a nickel dip tube (¼" O.D.) and an outlet for gaseous products. The outlet was connected to a series of three copper traps and a mercury seal at the end of the system. Gaseous products from the reactor were passed through the traps kept at Dry-Ice temperature, liquid nitrogen temperature and room temperature, respectively.

The reactor was then heated to 725° C. with an electric furnace while nitrogen was bubbled through the molten salt in the reactor for about one hour. Then a stream of chlorine was bubbled into the molten salt. After 5 hours 32 g. of $Cl_2$ was consumed and the reaction was stopped. The contents of the liquid nitrogen trap, approximately 20 g. were transferred in vacuum into a Monel cylinder for storage. Infrered spectroscopic analyses on the gaseous sample in the cylinder indicated the presence of ClF and $ClF_3$. The solid residue was removed from the reaction vessel and was shown to contain chloride ion by qualitative test with silver nitrate solution. The aqueous filtrate of the silver chloride precipitate oxidized potassium iodide-starch solution.

EXAMPLE II 41 g. AgF was placed in a 150 ml. Monel cylinder equipped with ¼" O.D. Monel dip tube and an outlet for gaseous products. The outlet was connected to a series of two copper traps kept at dry-ice and liquid nitrogen temperatures. Between these traps was an attachment for an infrared gas cell for the purpose of "on-stream" infrared spectroscopic analysis of the gaseous products. The system was evacuated and chlorine was passed through the AgF heated to 220° C. for 9 hours. On-stream infrared analysis of the gaseous products indicated the presence of ClF. The solid residue in the reaction vessel was analyzed and found to contain AgCl and unreacted AgF.

EXAMPLE III $AgBF_4$ was packed loosely into ⅜" O.D. copper tubing. This reactor was then connected to two traps and a device for the attachment with the infrared gas cell, as described in Example II. The system was evacuated and $Cl_2$ was passed through $AgBF_4$ heated to 150° C. After 3 hours of reaction time, ClF and $ClF_3$ were formed as indicated by the on-stream infrared spectroscopic analyses. Both ClF and $ClF_3$ were also formed at reaction temperatures of 200° and 250° C. $BF_3$ also appeared in the gas stream. All analysis of the gaseous product were done "on-stream" using infrared spectroscopy. The solid residue in the reaction vessel was analyzed and found to contain unreacted $AgBF_4$, AgF and AgCl.

EXAMPLE IV 45 g. (0.359 mole) of AgF, 23 g. (0.324 mole) of $Cl_2$ and 16 g. (0.8 mole) of HF were charged in a 250 ml. Monel autoclave which was previously passivated with chlorine trifluoride. The autoclave was heated at 200° C. with constant shaking. A pressure of 675 lb./in.$^2$ was gradually developed and remained constant throughout the heating period of 5 hours. The autoclave was cooled and the gaseous products, removed from the autoclave in vacuum at 150° C. into a Monel cylinder, amounted to 28.5 g. They were analyzed by vapor phase chromatography and found to be mainly $Cl_2$ and HF, characterized by their retention time, and ClF, characterized by its retention time and its oxidizing power on KI-starch paper.

The solid residue in the autoclave was also analyzed and found to contain 20.5% AgCl, indicating about 18.5% conversion of $Cl_2$ to ClF (based on AgF) according to the equation:

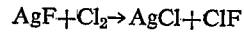

What is claimed is:

1. Process for preparing chlorine monofluoride which comprises heating a mixture of chlorine and a metal fluoride at 100° to 1000° C. and separating chlorine monofluoride from the resulting gases, the metal of said metal fluoride having an atomic number of 3 to 79 inclusive and standing in Group I of the Periodic Table.

2. Process as claimed in claim 1 in which said mixture additionally contains hydrogen fluoride.

3. Process as claimed in claim 1 in which said metal fluoride is AgF.

4. Process as claimed in claim 1 in which said metal fluoride is $AgBF_4$.

5. Process as claimed in claim 1 in which said metal fluoride is a mixture of NaF, LiF and $KHF_2$.

References Cited

UNITED STATES PATENTS 2,526,584  10/1950  Shenk _____ 23—88

OTHER REFERENCES

Ryss: The Chemistry of Fluorine and Its Inorganic Compounds, Moscow, The State Publishing House for Scientific, Technical, and Chemical Literature (1956), The U.S. Atomic Energy Commission Translation 3927, pp. 132 and 647.

OSCAR R. VERTIZ, Primary Examiner.

G. PETERS, Assistant Examiner.

U.S. Cl. X.R.

23—88